(12) United States Patent
Park et al.

(10) Patent No.: US 7,676,244 B2
(45) Date of Patent: Mar. 9, 2010

(54) MULTI-MODE-MULTI-BAND WIRELESS TRANSCEIVER

(75) Inventors: Hyung-Weon Park, Seoul (KR); Young-Il Son, Hwaseong-si (KR); Woo-Yong Lee, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 820 days.

(21) Appl. No.: 11/505,641

(22) Filed: Aug. 17, 2006

(65) Prior Publication Data

US 2007/0042802 A1 Feb. 22, 2007

(30) Foreign Application Priority Data

Aug. 17, 2005 (KR) ........................ 10-2005-0075301
Sep. 13, 2005 (KR) ............................... 2005-85311

(51) Int. Cl.
*H04M 1/00* (2006.01)
(52) U.S. Cl. .................................... 455/552.1; 370/276
(58) Field of Classification Search ........................ None
See application file for complete search history.

(56) References Cited

U.S. PATENT DOCUMENTS

| 5,881,369 | A | * | 3/1999 | Dean et al. .................... 455/78 |
| 6,492,883 | B2 | | 12/2002 | Liang et al. |
| 2003/0193923 | A1 | * | 10/2003 | Abdelgany et al. .......... 370/342 |
| 2005/0159180 | A1 | * | 7/2005 | Cheng et al. ............. 455/552.1 |
| 2005/0248418 | A1 | * | 11/2005 | Govind et al. ............... 331/179 |
| 2006/0098723 | A1 | * | 5/2006 | Toncich et al. .............. 375/219 |
| 2006/0258311 | A1 | * | 11/2006 | Pestryakov et al. ...... 455/165.1 |
| 2008/0125074 | A1 | * | 5/2008 | Hallivuori et al. ........... 455/334 |

FOREIGN PATENT DOCUMENTS

KR 1020010027596 4/2001
KR 1020020083709 11/2002

* cited by examiner

*Primary Examiner*—Ajit Patel
(74) *Attorney, Agent, or Firm*—The Farrell Law Firm, LLP (57) ABSTRACT

Disclosed is a multi-mode/multi-band wireless transceiver. The multi-mode/multi-band wireless transceiver includes a tunable duplexer including transmission and reception channel filters of which transmission and reception channel filtering frequencies respectively are controlled by an external element; and a control portion for controlling the transmission and reception channel filtering frequencies to correspond to transmission and reception channels of a current service band. Thus, a use of a RF SAW filter is unnecessary, while it is possible to support the multi-mode/multi-band using a tunable duplexer. Therefore, the number of parts and volume of the transceiver can be reduced, and it is possible to weaken a specification of an RF system.

14 Claims, 4 Drawing Sheets

MULTI-MODE-MULTI-BAND WIRELESS TRANSCEIVER

PRIORITY

This application claims priority to applications entitled "Multi-Mode/Multi-Band Wireless Transceiver" filed in the Korean Industrial Property Office on Aug. 17, 2005 and assigned Serial No. 2005-75301, and on Sep. 13, 2005 and assigned Serial No. 2005-85311 the contents of which are incorporated herein by reference.

BACKGROUND OF THE INVENTION

1. Field of the Invention

The present invention relates to a wireless transceiver, and more particularly to a wireless transceiver supporting a multi-mode/multi-band.

2. Description of the Related Art

Generally, countries all over the world employ different communication schemes for mobile communication services and each of mobile communication schemes uses various frequency bands.

The mobile communication schemes include, for example, a Code Division Multiple Access (CDMA) scheme, a Global System for Mobile (GSM) communication scheme, a General Packet Radio Service (GPRS) scheme, an Enhanced Data rates for GSM Evolution (EDGE) scheme, a Wide band Code Division Multiple Access (WCDMA) scheme, etc. in each country. The CDMA scheme uses frequency bands of 800 MHz, 1800 MHz and 1900 MHz. The GSM scheme uses frequency bands of 850 MHz, 900 MHz, 1800 MHz and 1900 MHz. The WCDMA scheme includes frequency bands of 850 MHz, 1900 MHz and 2000 MHz.

Previous wireless mobile stations have been manufactured to use signals of one or two frequency bands adapted to a specific communication service, to which a user has subscribed, among every mobile communication services. Thus, the mobile stations can only use one or two mobile communication services, among the various mobile communication services, which are used in a specific country. Therefore, when a user travels or makes a business trip to a region in which a communication service is different from that of his/her country, the use cannot use a mobile station of the region, which provides inconvenience for the user.

Thus, the user requires a mobile station capable of receiving the mobile communication service of all countries. Further, manufacturers of the mobile station need to manufacture a mobile station through which the user can use the mobile communication service in all the countries according to the user's requirement. In order to use all the mobile communication services that exist in a given country, there exists a need for a mobile station supporting multi-mode and multi-band. A term "multi-mode" means a Frequency Division Duplex (FDD) mode based on a WCDMA scheme, a Time Division Duplex (TDD) mode based on a GSM scheme, etc., while a term "multi-band" refers to different frequency bands.

Figure 1:
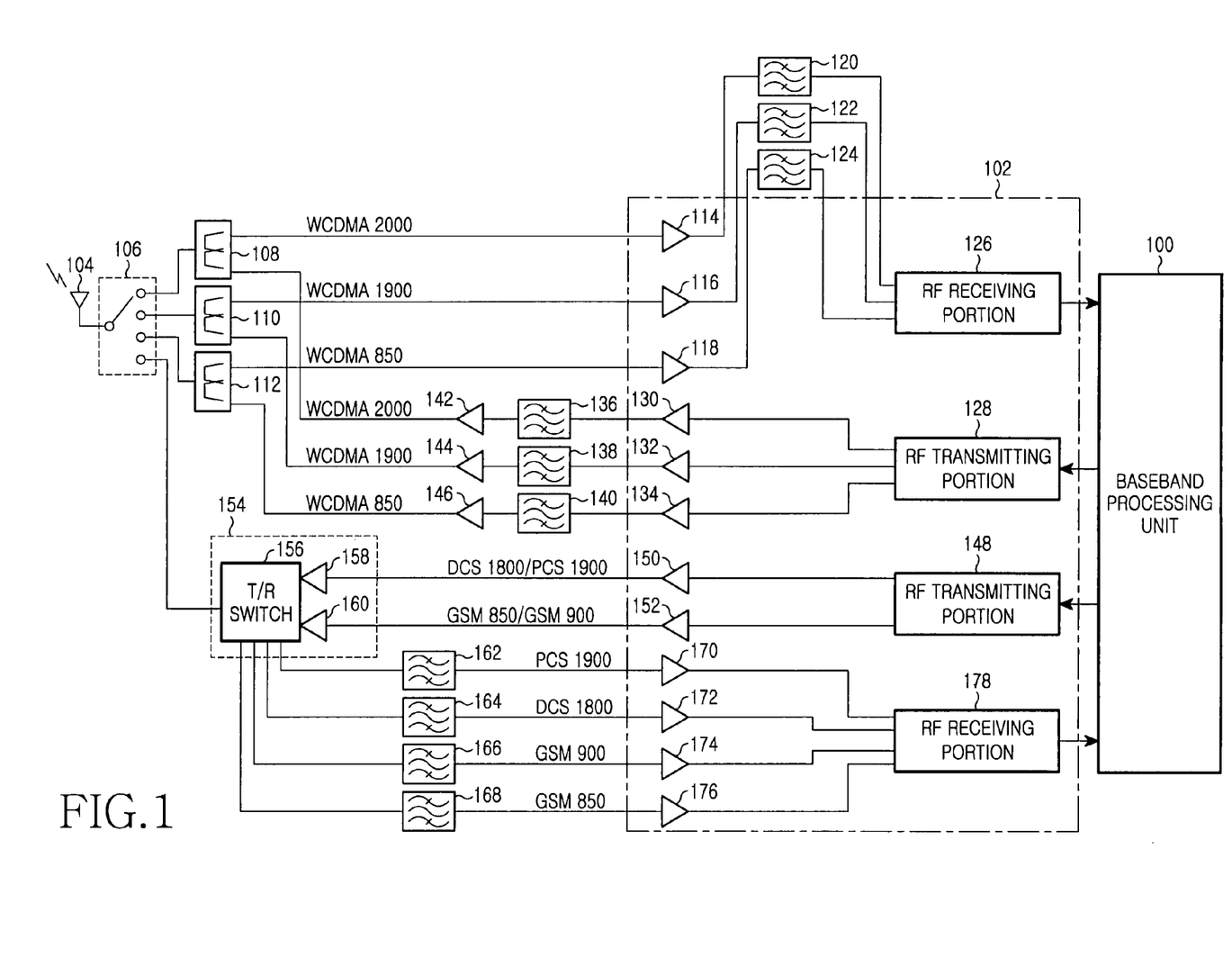
FIG. 1 is a block diagram illustrating a multi-mode/multi-band wireless transceiver.

It is possible to consider a multi-mode/multi-band wireless transceiver having a construction as shown in FIG. 1.

FIG. 1 shows a multi-mode/multi-band wireless transceiver, which supports two modes (i.e. the FDD mode and TDD mode), supports three service bands including WCDMA 2000, WCDMA 1900, and WCDMA 850 in the FDD mode, and supports four service bands including Personal Communication Service (PCS) 1900, Digital Cellular System (DCS) 1800, GSM 900, and GSM 850 in the TDD mode. In WCDMA 2000, WCDMA 1900, WCDMA 850, PCS 1900, DCS 1800, GSM 900 and GSM 850, the numbers 2000, 1900, 1800 and 850 represent the frequency bands of 2000 MHz, 1900 MHz, 1800 MHz and 850 MHz, respectively.

WCDMA 2000, WCDMA 1900 and WCDMA 850 respectively indicate the frequency bands of 2000 MHz, 1900 MHz and 850 MHz in the WCDMA scheme. PCS 1900, DCS 1800, GSM 900 and GSM 850 respectively indicate the frequency bands of 1900 MHz, 1800 MHz, 900 MHz and 850 MHz.

Referring to FIG. 1, an antenna 104 is selectively connected by means of a switch 106 to one of duplexers 108, 110 and 112, and a Transmitting/Receiving (T/R) switch 156. The duplexers 108, 110 and 112 separate transmitting and receiving signals of three frequency bands of WCDMA 2000, WCDMA 1900, and WCDMA 850 in the FDD mode, respectively. The T/R switch 156 switches transmission and reception relating to the frequency bands of PCS 1900, DCS 1800, GSM 900, and GSM 850.

An operation of the multi-mode/multi band wireless transceiver, in which a current service frequency band is one of the WCDMA 2000, WCDMA 1900, and WCDMA 850, and which operates in the FDD mode with relation to a reception of signal, will be described with reference to FIG. 1. Received signals introduced from the antenna 104 to the switch 106 are applied to one, which corresponds to the current service frequency band, of Low Noise Amplifiers (LNA) 114, 116 and 118 of a Radio Frequency Integrated Circuit (RFIC) 102 and amplified through one, which corresponds to the current service frequency band of the WCDMA 2000, WCDMA 1900 and WCDMA 850, of the duplexers 108, 110 and 112. The received signal amplified by each LNA 114, 116 or 118 is input to a Radio Frequency (RF) receiving portion 126 through each Radio Frequency Surface Acoustic Wave (RF SAW) filter 120, 122, or 124 which is installed outside the RFIC 102, and is converted into a baseband signal by the RF receiving portion 126, which is finally provided to a baseband processing unit 100. The baseband processing unit 100 functions as a modem for mobile communication in the case where the multi-mode/multi-band wireless transceiver is employed in a mobile station.

An operation of the multi-mode/multi band wireless transceiver, in which a current service frequency band is one of the WCDMA 2000, WCDMA 1900, and WCDMA 850, and which operates in the FDD mode with relation to a transmission of signal, will also be described with reference to FIG. 1. A baseband signal transmitted from the baseband processing unit 100 to a RF transmitting portion 128 is converted to an RF signal and then is pre-power-amplified by one, which corresponds to the current service band, of Pre-Power Amplifiers (PPA) 130, 132 and 134. The transmitted signal pre-power amplified by each PPA 130, 132, or 134 passes through one, which corresponds to the current service frequency band, of Band Pass Filters (BPF) 136, 138 and 140 and is power-amplified by each Power Amplifier (PA) 142, 144, or 146, which in turn is applied to a switch 106 through one, which corresponds to the current service frequency band, of the duplexers 108, 110 and 112. Then, the signal is transmitted by way of the switch 106 and the antenna 104.

An operation of the multi-mode/multi band wireless transceiver in which a current service frequency band is one of the PCS 1900, DCS 1800, GSM 900 and GSM 850 and which operates in the TDD mode, with relation to a reception of signal, will also be described with reference to FIG. 1. A signal introduced from the antenna 104 to the switch 106 passes through the T/R switch 156 of a PA module 154 and one, which corresponds to the current service frequency band, of BPFs 162, 164, 166 and 168 and then is applied to one, which corresponds to the current service frequency band, of the LNAs 170, 172, 174 and 176 of the RFIC 102. The signal amplified by each LNA 170, 172, 174 or 176 is input in a RF receiving portion 178 and converted into a baseband signal by means of the RF receiving portion 178. Then, the signal is provided to the baseband processing unit 100.

An operation of the multi-mode/multi band wireless transceiver in which a current service frequency band is one of the PCS 1900, DCS 1800, GSM 900 and GSM 850 and which operates in the TDD mode, with relation to a transmission of signal, will also be described with reference to FIG. 1. The baseband signal is transmitted from the baseband processing unit 100 to the RF transmitting portion 148 and then converted into a RF signal by means of the RF transmitting portion 148. Then, the RF signal is pre-power-amplified by one PPA 150 or 152 corresponding to the current service frequency band. After being power-amplified by PA 158 or 160 of the PA module 154, the amplified signal is applied to the switch 106 by way of the T/R switch 156. Finally, the amplified signal is transmitted through the switch 106 and the antenna 104.

The multi-mode/multi-band wireless transceiver constructed as shown in FIG. 1 employs a separate duplexer for each service mode or each service band in the FDD mode. This is necessary because the transceiver uses a duplexer having a fixed band for transmission/reception filtering.

Further, a separate RF SAW filter through which the service frequency band passes must be adapted to each service mode or each service band. The reason for this is because the transmitting and receiving filter of the duplexer is a band filter. The main reason for using the RF SAW filter is to decrease an interference of the transmission signal with the signal receiving band in the FDD mode.

However, since the duplexer, or SAW filter, is a band pass filter which passes the service band, it is not helpful to improve an in-band blocking characteristic or to relieve Input $3^{rd}$ Order Intercept Point (IIP3) and Input $2^{nd}$ Order Intercept Point (IIP2) characteristics of a mixer which converts the received signal into a low band in the RF receiving portion. Thus, it is difficult to relax a specification of the RF system.

Further, since a separate duplexer and the RF SAW filter are used in every service mode or in every frequency band, respectively, they are a burden to the transceiver in view of cost, volume and required mounting area. Specially, an active element tends to have a gradually smaller size as circuit technology has been developed. However, since an inactive element, such as RF SAW filter, still does not have a small size, it is a burden to the transceiver.

In the case of supporting all the different service modes, such as FDD and TDD, since a duplexer for the FDD mode and a T/R switch for T/R switching must be separately used in the transceiver, they are a burden to the transceiver in view of cost, volume and required mounting area of the transceiver.

SUMMARY OF THE INVENTION

Accordingly, the present invention has been made to solve the above-mentioned problems occurring in the prior art, and an object of the present invention is to provide a multi-mode/multi-band wireless transceiver which includes a reduced number and volume of elements in a multi-mode or multi-band as well as in a single mode or a single band, and in which a specification of a RF system can be weakened.

In order to accomplish this object, according to an aspect of the present invention, there is provided a multi-mode/multi-band wireless transceiver which includes: a tunable duplexer including transmission and reception channel filters, of which transmission and reception channel filtering frequencies, respectively, are controlled by an external element; and a control portion for controlling the transmission and reception channel filtering frequencies to correspond to transmission and reception channels of a current service band.

In order to accomplish this object, according to another aspect of the present invention, there is provided a multi-mode/multi-band wireless transceiver which includes: a tunable duplexer including transmission and reception channel filters of which transmission and reception channel filtering frequencies are respectively controlled by an external element; transmission and reception routes corresponding to plural service bands, respectively; a reception band switch for selectively connecting one of the reception routes, which corresponds to a current service band, to the reception channel filter; a transmission band switch for selectively connecting one of the transmission routes, which corresponds to a current service band, to the transmission channel filter; and a control portion for controlling the transmission and reception channel filtering frequencies to correspond to transmission and reception channels of the current service band, respectively, and for controlling the reception and transmission band switches to correspond to the current service band.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings. In the following description of the present invention, a detailed description of known functions and configurations incorporated herein will be omitted to avoid making the subject matter of the present invention unclear.

Figure 2:
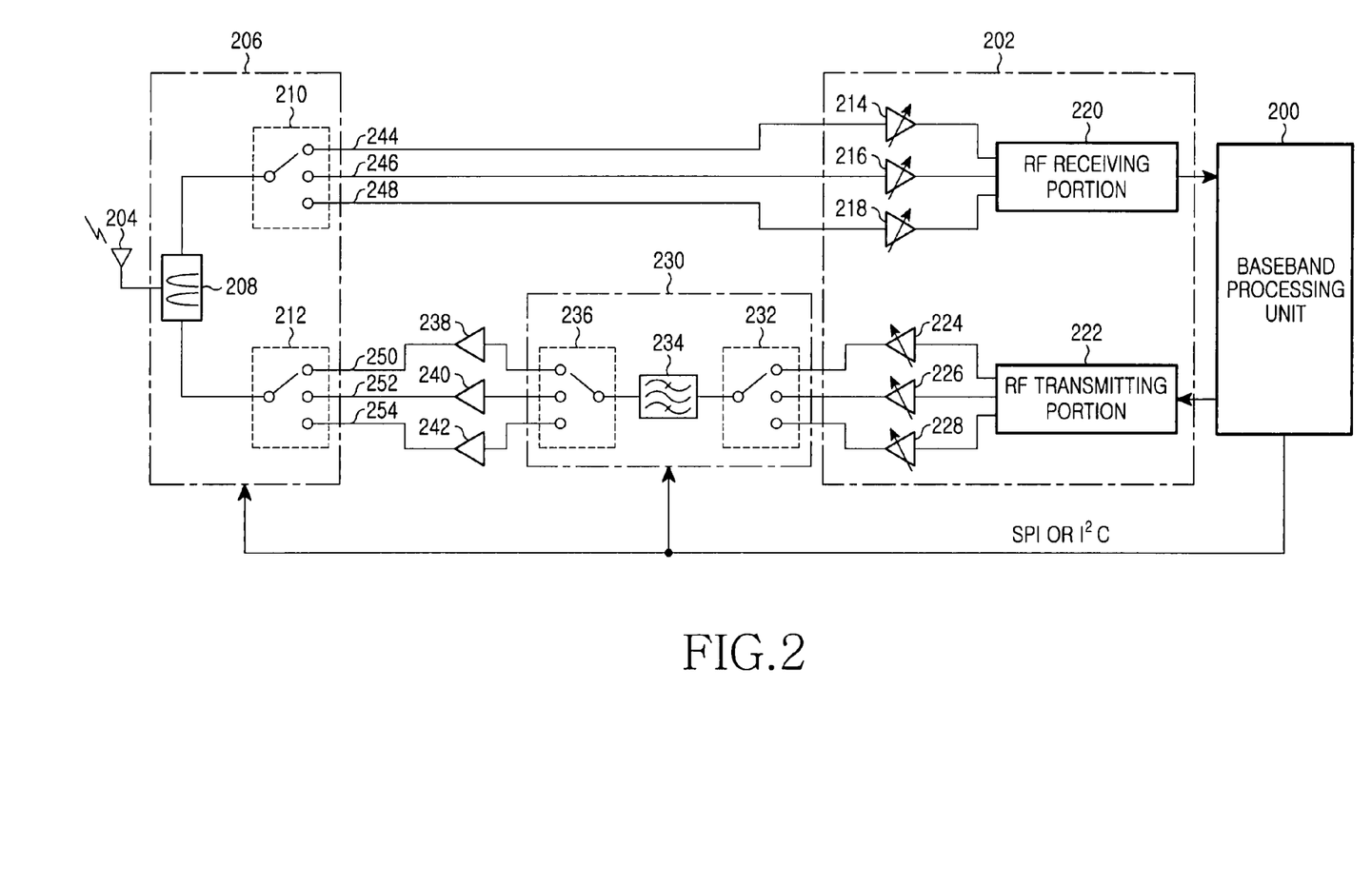
FIG. 2 is a block diagram illustrating a multi-mode/multi-band wireless transceiver according to an embodiment of the present invention.

FIG. 2 is a block diagram illustrating a multi-mode/multi-band wireless transceiver according to an embodiment of the present invention: The multi-mode/multi-band wireless transceiver of FIG. 2 employs a tunable duplexer 208. The tunable duplexer 208 includes channel filter having a frequency response characteristics 304 and 306 as shown in FIG. 3, and is capable of varying transmission and reception channel filtering frequency, in a manner different from the duplexers 108, 110 and 112 of FIG. 1, which are band filters for filtering a service band.

Figure 3:
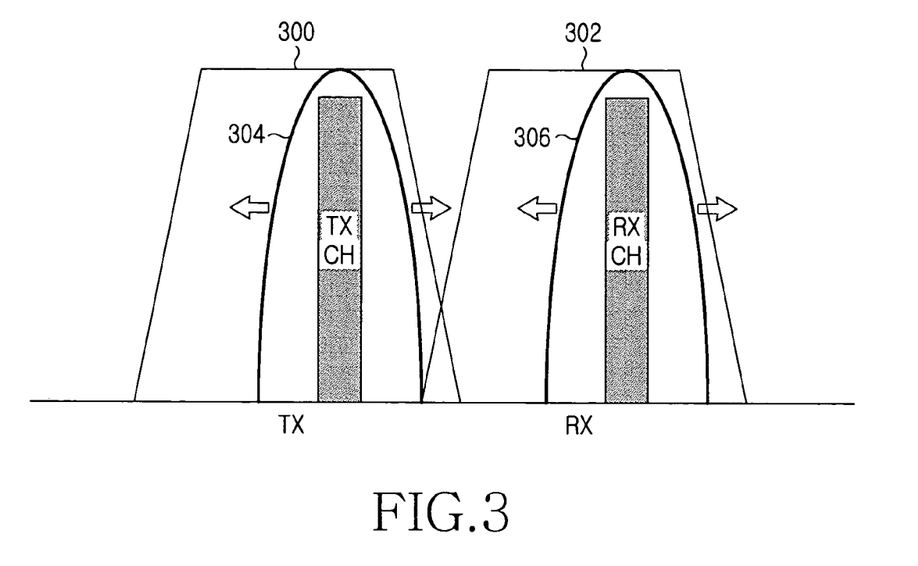
FIG. 3 is a graph showing frequency response characteristics of a duplexer having a variable band according to the embodiment of the present invention compared to those of a duplexer having a fixed band filter.

FIG. 3 shows a comparison of frequency response characteristics of the tunable duplexer 208 of FIG. 2 to those of a duplexer functioning as a fixed band filter such as the duplexers 108, 110 and 112 of FIG. 1. In FIG. 3, reference numerals 300 and 302 respectively denote a transmission frequency response and a reception frequency response of the duplexer being a fixed band filter, and reference numerals 304 and 306 respectively denote a transmission frequency response and a reception frequency response of the tunable duplexer 208. As shown in FIG. 3, it is understood that the frequency responses 300 and 302 of the duplexer (being the fixed band filter) filters a band with respect to a transmission band and a reception band, while the tunable duplexer 208 filters a channel with respect to a transmission channel TX CH and a reception channel RX CH. Further, the left and right arrows mean that the transmission and reception channel filtering frequencies of the tunable duplexer 208 can be tunable.

The tunable duplexer 208 includes transmission channel and reception channel filters of which the transmission and reception channel filtering frequencies are respectively controlled by an external controller. The transmission and reception channel filtering frequencies of such a tunable duplexer 208 is controlled by a baseband processing unit 200. The baseband processing unit 200 controls the transmission and reception channel filtering frequencies so as to correspond to transmission and reception channels of a current service band through a Serial Peripheral Interface (SPI) or Inter Integrated Circuit (I$^2$C) interface. Thus, the tunable duplexer 208 can divide the transmission and reception signals by filtering channels according to the transmission and reception channels of the current service band.

Figure 4:
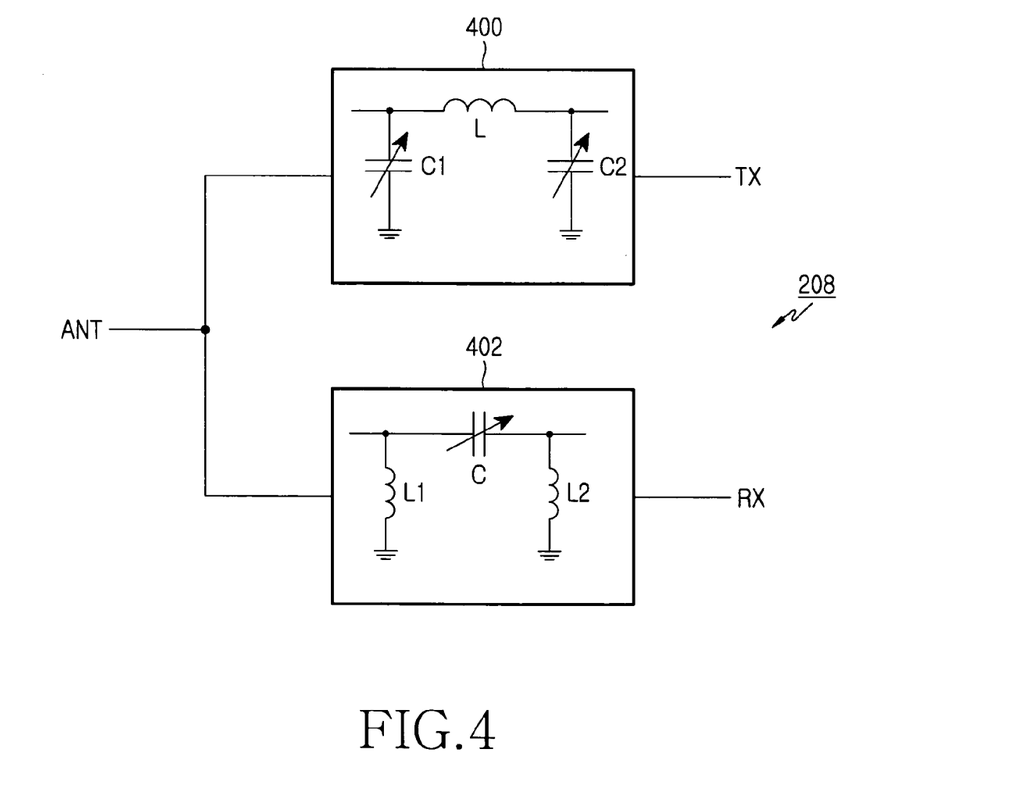
FIG. 4 is a view showing an equivalent circuit of the tunable duplexer according to the embodiment of the present invention.

Referring to FIG. 4 showing an equivalent circuit diagram of the tunable duplexer 208, the tunable duplexer 208 includes a transmission channel filter 400 which is disposed between an antenna terminal ANT and a transmission signal input terminal TX to connect the transmission signal input terminal TX to the antenna terminal ANT, and a reception channel filter 402 which is disposed between the antenna terminal ANT and a reception signal output terminal RX to connect the reception signal output terminal RX to the antenna terminal ANT. The transmission channel filter 400 includes an inductor L which is disposed between and connected in serial to the antenna terminal ANT and the transmitted signal input terminal TX, and tunable capacitors C1 and C2 disposed between and connected in parallel to both ends of the inductor L and grounds, respectively, so as to form the equivalent circuit. The reception channel filter 402 includes a tunable capacitor C, which is disposed between and connected in serial to the antenna terminal ANT and the received signal output terminal RX, and inductors L1 and L2, which is disposed between and connected in parallel to both ends of the tunable capacitor C and grounds, respectively, so as to form the equivalent circuit.

The baseband processing unit 200 varies capacitance, i.e. capacitances of the tunable capacitors C1 and C2, and capacitance of the tunable capacitor C to control the transmission and reception channel filtering frequency of each transmission and reception channel filter 400 or 402. The transmission and reception channel filters 400 and 402 include a capacitor bank (not shown) in order to control the capacitances of the tunable capacitors C1, C2, and C.

The capacitor bank is provided with a plurality of capacitors having various reference capacitances. The baseband processing unit 200 selects a combination of the capacitors, which corresponds to necessary capacitances, of the capacitors of the capacitor bank and provides the capacitors as the tunable capacitors C1, C2, and C. Registers and switches select the necessary capacitors of the capacitors of the capacitor bank and to provide tunable capacitances. That is, the selection of the capacitors which is performed by the switches and a switching control for the switches of the baseband processing unit 200, can be accomplished through the registers.

The variable frequency range using such a capacitor bank, and bandwidths and characters of the transmission and reception channel filters 400 and 402 are determined by a service band being used. The capacitor bank is designed to control the capacitance corresponding to the frequencies of the channels according to all the usable service bands of the multi-mode/multi-band wireless transceiver of FIG. 2.

The tunable duplexer 208 is preferably a Micro-Electro-Mechanical System (MEMS) device having excellent isolation characteristic and an insertion loss characteristics, as well as a reduced size.

A reception band switch 210 is connected to the reception channel filter of the tunable duplexer 208. The reception band switch 210 selectively connects a receiving route to the reception channel filter, with the receiving route corresponding to a current service band, of receiving routes 244, 246 and 248 which correspond to plural service bands, respectively. Further, a transmission band switch 212 is connected to the transmission channel filter of the tunable duplexer 208. The transmission band switch 212 selectively connects a transmitting route, which corresponds to the current service band, of the transmitting routes 250, 252 and 254 which correspond to plural service bands, respectively, to the reception channel filter.

Also, the reception band switch 210 and the transmission band switch 212 are preferably made of the MEMS device. Specially, the tunable duplexer 208, the reception band switch 210 and the transmission band switch 212 are preferably integrated on the MEMS device having excellent isolation and insertion loss characteristics. Reference numeral 206 denotes the MEMS device including the tunable duplexer 208, the reception band switch 210, and the transmission band switch 212. Further, switching of the reception band switch 210 and the transmission band switch 212 is achieved by control of the baseband processing unit 200. The baseband processing unit 200 controls the reception band switch 210 and the transmission band switch 212 to correspond to the current service band through the SPI or I$^2$C interface.

The reception band switch 210 is connected to the RF receiving portion 220 of the RF IC 202 through the reception routes 244, 246 and 248. The transmission band switch 212 is connected to the RF transmitting portion 222 of the RF IC 202 through the transmission routes 250, 252 and 254. The RF IC 202 includes the tunable LNAs 214, 216 and 218, the RF receiving portion 220, the RF transmitting portion 222, and the tunable PPAs 224, 226 and 228. The RF receiving portion 220 and the RF transmitting portion 222 of the RF IC 202 are connected to the baseband processing unit 200.

The reception routes 244, 246, and 248 and the transmission routes 250, 252 and 254 are illustrated as examples in the case where the multi-mode/multi-band wireless transceiver of FIG. 2 provides the service bands divided into three bands, i.e. a high band, an intermediate band, and a low band. That is, the reception route 244 and the transmission route 250 are routes to transmit and receive RF signals of the high band, the reception route 246 and the transmission route 252 are routes to receive and transmit RF signals of the intermediate band, and the reception route 248 and the transmission route 254 are routes to transmit and receive RF signals of the low band.

For example, the high band is set to a frequency of 2000 MHz, the intermediate band is set to a frequency of 1800 MHz~1900 MHz, and the low band is set to a frequency of 800 MHz~900 MHz. As shown in FIG. 1, provided that the wireless transceiver supports WCDMA 2000, WCDMA 1900, WCDMA 850, PCS 1900, DCS 1800, GSM 850, and GSM 900, RF signals based on WCDMA 2000 are received and transmitted through the reception route 244 and the transmission route 250, RF signals based on WCDMA 1900, PCS 1900 and DCS 1800 are transmitted and received through the reception route 246 and the transmission route 252, and RF signals based on WCDMA 850, GSM 850 and GSM 900 are transmitted and received through the reception route 248 and the transmission route 254.

The reception routes 244, 246 and 248 respectively include the tunable LNAs 214, 216 and 218 which amplify the reception signals of the high, intermediate and low bands. The LNAs 214, 216 and 218 have amplification characteristics corresponding to the high, intermediate and low bands, respectively.

The transmission routes 250, 252 and 254 respectively include the tunable PPAs 224, 226 and 228 which respectively can pre-power-amplify the transmission signals of the high, intermediate and low bands, and the PAs 238, 240 and 242 which respectively power-amplify the pre-power-amplified transmission signals. PPAs and PAs having amplification characteristics corresponding to the high, intermediate and low bands are used as the PPAs 224, 226 and 228 and the PAs 238, 240 and 242. Further, an input switch 232, a BPF 234, and an output switch 236 are arranged in the transmission routes 250, 252 and 254, which are disposed between and connected to the PPAs 224, 226 and 228 and the PAs 238, 240 and 242.

The input switch 232 selectively connects one output terminal, which corresponds to the current service band, of the PPAs 224, 226 and 228 of the transmission routes 250, 252 and 254 to an input terminal of the BPF 234. The BPF 234 is controlled such that a filtering band corresponds to the current service band by control of the baseband processing unit 200. The output switch 236 selectively connects the output terminal of the BPF 234 to the input terminal of one of the PAs 238, 240 and 242, which corresponds to the current service band, on the transmission routes 250, 252 and 254.

Preferably, the BPF 234 and the input and output switches 232 and 236 also are integrated on a MEMS device having excellent isolation and insertion loss characteristics. Reference numeral 230 denotes the MEMS device including the BPF 234 and the input and output switches 232 and 236. Further, the switching of the input and output switches 232 and 236 also is achieved by a control of the baseband processing unit 200. The baseband processing unit 200 controls the BPF 234 and the input and output switches 232 and 236 through the SPI or I²C so that the BPF 234 and the input and output switches 232 and 236 corresponds to the current service band.

Hereinafter, an operation of the multi-mode/multi-band wireless transceiver will be described with reference to FIG. 2. The tunable duplexer 208 separates the signals corresponding to the channel of the current service band from the signals, which are received by the antenna 204, using the reception channel filter and outputs the signals to the reception band switch 210. The reception band switch 210 outputs the signals input from the tunable duplexer 208 to a reception route, which corresponds to the current service band, of the reception routes 244, 246 and 248. Thus, after the reception signals corresponding to the channel of the current service band is amplified by an LNA of the tunable LNAs 214, 216 and 218, which correspond to the channel of the current service band, the reception signals are input to the RF receiving portion 220, converted by the RF receiving portion 220 into baseband signals, and supplied to the baseband processing unit 200.

After being converted by the RF transmitting portion 222 into the RF signals, the transmission signals of the baseband applied from the baseband processing unit 200 to the RF transmitting portion 222 are pre-power-amplified by one of the PPAs 224, 226 and 228, which correspond to the current service band, and is on the transmission routes 250, 252 and 254. The amplified transmission signals are input through the input switch 232 to the BPF 234, and filtered based on the current service band. After being amplified by one of the PAs 238, 240 and 242, which correspond to the current service band, the filtered transmission signals are transmitted through the transmission band switch 212, the tunable duplexer 208, and the antenna 204.

In comparison with the device of FIG. 1, it is noted that the multi-mode/multi-band wireless transceiver of FIG. 2 has a tunable duplexer 208 substituted for the duplexers 108, 110 and 112 and the T/R switch 156. That is, as the transmission and reception channel filtering frequency is controlled to correspond to the channel of the current service band, only one tunable duplexer 208 can be used instead of the duplexers 108, 110 and 112, and the T/R switch 156.

Further, the tunable duplexer 208 is not a band filter but a channel filter filtering the transmission and reception channel, so as to have very excellent selectivity for channels. In particular, when a high Q channel filter is used as the transmission and reception channel filter of the tunable duplexer 208, the tunable duplexer 208 can have a attenuation characteristic and an isolation characteristic superior to those of the duplexer filtering the bands. Thus, it is unnecessary to use the inactive element, i.e. the RF SAW filters 120, 122 and 124 on the receiving routes as shown in FIG. 1, needed in the FDD scheme. That is, the RF SAW filters 120, 122 and 124, which are used between mixers in order to convert the reception signals of the LNAs 114, 116 and 118, and the RF receiving portion 126 into a low band, are removed because of the excellent isolation and attenuation characteristic of the tunable duplexer 208. Further, since the tunable duplexer 208 is a channel filter, it is possible to significantly improve the in-band blocking characteristic and to weaken the specification of the system by weakening IIP3 and IIP2 characteristics of the mixer converting the reception signals in the RF receiving portion 220 into the low band.

With relation to the multi-mode/multi-band wireless transceiver of FIG. 1, further, if the RF SAW filters 120, 122 and 124 are not used for the multi-mode/multi-band wireless transceiver, a linear characteristic of the mixer in the RF receiving portion 126 must be highly increased, thereby increasing consumption of electricity. To the contrary, even if the RF SAW filter is not used for the multi-mode/multi-band wireless transceiver of FIG. 2, the tunable duplexer 208 provides proper filtering. Thus, consumption of electricity does not increase.

Further, the multi-mode/multi-band wireless transceiver shares one RF system, i.e. a tunable duplexer 208, an RF receiving portion 220, and an RF transmitting portion 222, in the case of supporting two different modes e.g. FDD mode and TDD mode and plural service bands. Therefore, the wireless transceiver can have a reduced mounting area which is important for a terminal, a lower price, and is applied to the terminal in a manner which considers Software Defined Radio(SDR).

Figure 5:
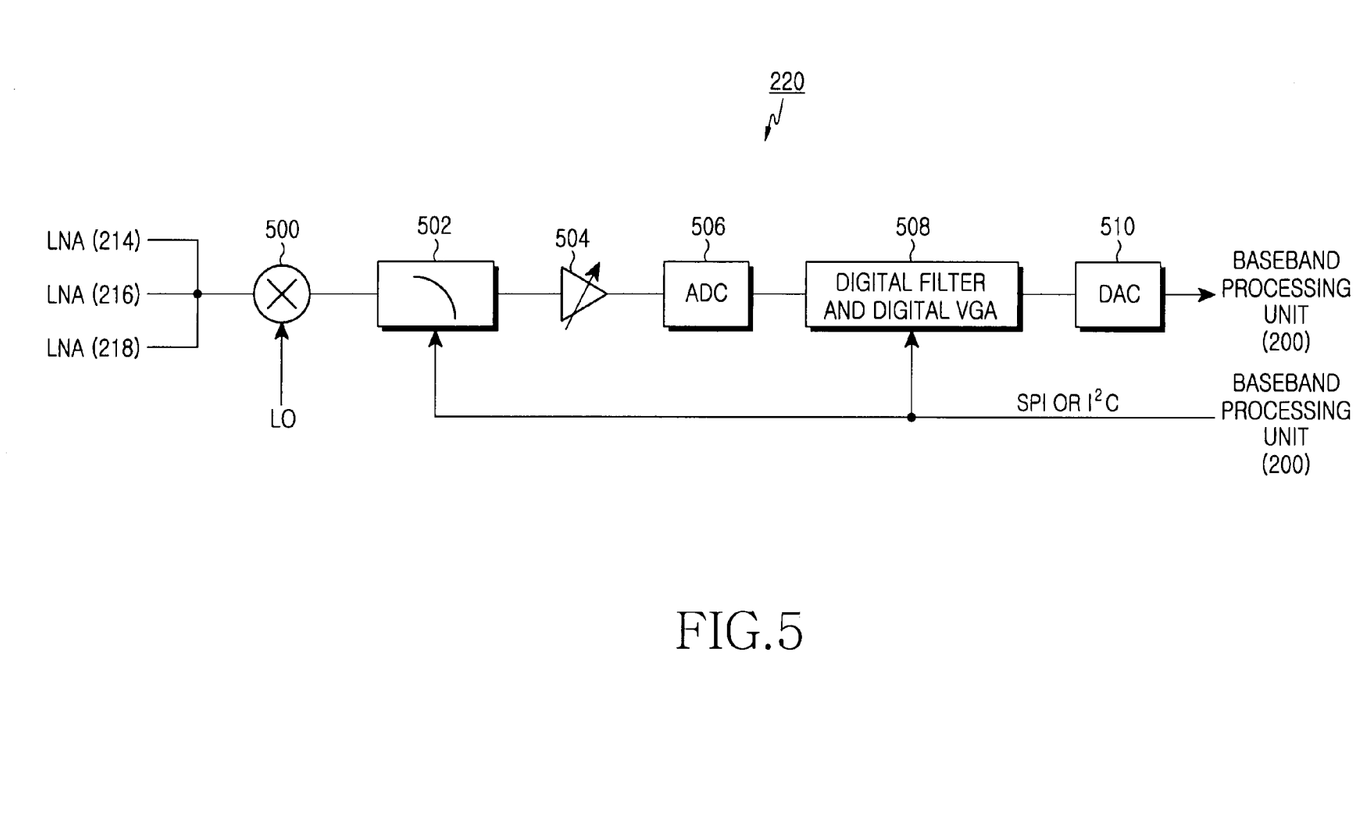
FIG. 5 is a block diagram showing a RF receiver according to the embodiment of the present invention.

FIG. 5 is a block diagram showing an RF receiving portion 220 according to the embodiment of the present invention. The RF receiving portion 220 includes a mixer 500, a tunable analog filter 502, a Variable Gain Amplifier (VGA) 504, an Analog-to-Digital Converter (ADC) 506, a digital filter and digital VGA 508, and a Digital-to-Analog Converter (DAC)

510. The tunable analog filter 502, and the digital filter and digital VGA 508 have a filtering frequency and an amplification gain which vary by the baseband processing unit 200. The baseband processing unit 200 controls the tunable analog filter 502, and the digital filter and digital VGA 508 to correspond to the reception channel frequency of the current service band through the SPI or I²C interface.

The received signals, which are input from one LNA, which corresponds to the current service band of the LNAs 214, 216 and 218 of FIG. 2 are mixed with a local frequency signal LO by the mixer 500, and then converted into the low band. In turn, the received signals are filtered by the tunable analog filter 502 to correspond to the channel of the current service band. Then, the received signals are converted by the ADC 506 into digital signals, processed by the digital filter and digital VGA 508, converted by the DAC 510 into analog signals, and then provided to the baseband processing unit 200.

As described above, the tunable analog filter 502 and the digital filter and digital VGA 508 are a channel filter like the tunable duplexer 208, so as to have very excellent channel selectivity.

As described above, since the multi-mode/multi-band wireless transceiver of the present invention employs the tunable duplexer, the wireless transceiver can support all the multi-mode and multi-band using only one duplexer.

Further, as the tunable duplexer having excellent channel selectivity, attenuation characteristics and isolation characteristics is used as the channel filter, it is unnecessary to use the RF SAW filter required for reception route of the FDD scheme, and it is possible to significantly improve the in-band blocking characteristic and to weaken the IIP3 and IIP2 characteristics of the mixer for converting the received signals into the low band.

Accordingly, the number of the parts, the mounting area, and the specification of the RF system can be weakened.

While the embodiment of the present invention is described to support the multi-mode/multi-band, the present invention can be applied to a wireless transceiver supporting a single-mode/multi-band. In this case, the tunable duplexer 208 is used for the transceiver, so that it is unnecessary to place the RF SAW filter in the reception route.

FIG. 2 shows the reception route and the transmission route having three bands, respectively. However, if there is no problem in the band amplification characteristic of the LNAs 214, 216 and 218, the PPAs 224, 226 and 228, and the PAs 238, 240 and 242, a single reception route and a single transmission route may be used. In the case where the service band supports a single band and not multi band in a single-mode as well as a multi-mode, a single reception route and a single transmission route may be further used. In this case, it is unnecessary to use the transmission and reception band switches 212 and 210, and the input and output switches 232 and 236. Furthermore, an LNA 214, 216 or 218, a PPA 224, 226 or 228, and a PA 238, 240, or 242 may be used.

It may be unnecessary to use the BPF 234 according to the structure of the RF transmitting portion 222. That is, if a direct conversion type RF transmission is employed in the wireless transceiver, the BPF 234 is necessary. However, if a polar type RF transmission is employed in the wireless transceiver, the BPF 234 is unnecessary.

Further, while it is illustrated as an example for the baseband processing unit 200 to control the tunable duplexer 208, the transmission and reception band switches 210 and 212, the input and output switches 232 and 236, the BPF 234, the tunable analog filter 502 of the RF receiving portion 220, and the digital filter and digital VGA 508, a Central Processing Unit (CPU) instead of the baseband processing unit 200 can be employed in order to control these elements.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A multi-mode/multi-band wireless transceiver comprising:
a tunable duplexer including transmission and reception channel filters of which transmission and reception channel filtering frequencies are respectively controlled by an external element;
transmission and reception routes corresponding to a plurality of service bands in a Frequency Division Duplex (FDD) mode and a Time Division Duplex (TDD) mode, respectively;
a reception band switch for selectively connecting one of the reception routes, which corresponds to a current service band, to the reception channel filter, wherein the reception routes comprise a high band reception route, an intermediate band reception route, and a low band reception route for supporting signals of the plurality of service bands;
a transmission band switch for selectively connecting one of the transmission routes, which corresponds to a current service band, to the transmission channel filter, wherein the transmission routes comprise a high band transmission route, an intermediate band transmission route, and a low band transmission route for supporting signals of the plurality of service bands; and
a control portion for controlling the transmission and reception channel filtering frequencies to correspond to transmission and reception channels of the current service band, respectively, and for controlling the reception and transmission band switches to correspond to the current service band.

2. The multi-mode/multi-band wireless transceiver as claimed in claim 1, wherein the transmission and reception channel filtering frequencies are controlled by tuning capacitance of each of the transmission and reception channel filters using the control portion, and the transmission and reception channel filters include a capacitor bank which is tuned by means of the control portion, so that the capacitance corresponds to channels based on all service bands.

3. The multi-mode/multi-band wireless transceiver as claimed in claim 1, wherein the tunable duplexer is a Micro-Electro-Mechanical System device.

4. The multi-mode/multi-band wireless transceiver as claimed in claim 3, wherein the tunable duplexer and the transmission and reception band switches are integrated on the Micro-Electro-Mechanical System.

5. The multi-mode/multi-band wireless transceiver as claimed in claim 2, wherein the transmission and reception channel filters are high Q filters.

6. The multi-mode/multi-band wireless transceiver as claimed in claim 1, wherein the control portion is a baseband processing unit for treating transmission and reception signals of a baseband corresponding to Radio Frequency (RF) signals which are transmitted and received through the tunable duplexer.

7. The multi-mode/multi-band wireless transceiver as claimed in claim 6, wherein the baseband processing unit controls the transmission and reception channel filtering frequencies through a Serial Peripheral Interface (SPI), and also controls the transmission and reception band switches.

8. The multi-mode/multi-band wireless transceiver as claimed in claim 6, wherein the baseband processing unit controls the transmission and reception channel filtering frequencies through an Inter Integrated Circuit (I²C) interface, and also controls the transmission and reception band switches.

9. The multi-mode/multi-band wireless transceiver as claimed in claim 1, wherein the reception routes each include a Low Noise Amplifier (LNA) for amplifying reception signals of a reception band of the plural service bands, which correspond to the LNA, and the transmission routes each include a Power Amplifier (PA) for power-amplifying transmission signals of a transmission band of the plural service bands, which corresponds to the PA.

10. The multi-mode/multi-band wireless transceiver as claimed in claim 1, further comprising:
a Band Pass Filter (BPF) controlled by an external control such that a filtering band corresponds to the current service band;
an input switch for selectively connecting an output terminal of a Pre-Power Amplifier (PPA), which corresponds to the current service band, of Pre-Power Amplifiers (PPAs) in each transmission route to an input terminal of the BPF; and
an output switch for selectively connecting an input terminal of one Power Amplifier (PA), which corresponds to the current service band, of the PAs in each transmission route to an output terminal of the BPF,
wherein the reception routes each include a Low Noise Amplifier (LNA) for amplifying reception signals of a reception band of the plural service bands, which correspond to the LNA, the transmission routes each include a Pre-Power Amplifier (PPA) for pre-power amplifying transmission signals of a transmission band of the plural service bands, which correspond to the PPA, and a Power Amplifier (PA) for power-amplifying transmission signals of a transmission band of the plural service bands, which corresponds to the PA, and the control portion controls the Band Pass Filter (BPF), and the input and output switches to correspond to the current service band.

11. The multi-mode/multi-band wireless transceiver as claimed in claim 10, wherein the Band Pass Filter (BPF), and the input and output switches are integrated on a Micro-Electro-Mechanical System (MEMS) device.

12. The multi-mode/multi-band wireless transceiver as claimed in claim 10, wherein the control portion is a baseband processing unit for treating transmission and reception signals of a baseband corresponding to Radio Frequency (RF) signals which are transmitted and received through the tunable duplexer.

13. The multi-mode/multi-band wireless transceiver as claimed in claim 12, wherein the baseband processing unit controls the transmission and reception channel filtering frequencies through a Serial Peripheral Interface (SPI), and also controls the transmission and reception band switches.

14. The multi-mode/multi-band wireless transceiver as claimed in claim 12, wherein the baseband processing unit controls the transmission and reception channel filtering frequencies through an Inter Integrated Circuit (I²C) interface, and also controls the transmission and reception band switches.

* * * * *